(12) United States Patent
Stephens et al.

(10) Patent No.: US 11,392,427 B2
(45) Date of Patent: Jul. 19, 2022

(54) LOCK-FREE READING OF UNITARY VALUE SETS

(71) Applicant: Microsoft Technology Licensing, LLC, Redmond, WA (US)

(72) Inventors: Maoni Zhang Stephens, Kirkland, WA (US); Patrick Henri Dussud, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 208 days.

(21) Appl. No.: 16/735,418

(22) Filed: Jan. 6, 2020

(65) Prior Publication Data

US 2021/0208954 A1    Jul. 8, 2021

(51) Int. Cl.
G06F 9/52       (2006.01)
G06F 9/38       (2018.01)
G06F 9/46       (2006.01)
G06F 9/30       (2018.01)
G06F 12/02      (2006.01)

(52) U.S. Cl.
CPC ............ *G06F 9/524* (2013.01); *G06F 9/3004* (2013.01); *G06F 9/3851* (2013.01); *G06F 9/466* (2013.01); *G06F 9/522* (2013.01); *G06F 9/526* (2013.01); *G06F 12/0253* (2013.01); *G06F 2212/702* (2013.01)

(58) Field of Classification Search
None
See application file for complete search history.

(56) References Cited

U.S. PATENT DOCUMENTS 6,047,295 A    4/2000 Endicott et al.
6,502,111 B1   12/2002 Dussud
(Continued)

FOREIGN PATENT DOCUMENTS

WO    2020005597 A1    1/2020

OTHER PUBLICATIONS

Gooijer et al., Performance Impact of Lock-Free Algorithms on Multicore Communication APIs, 2014, arXiv.org, CoRR, pp. 1-16 (Year: 2014).*

(Continued)

*Primary Examiner* — Abu Zar Ghaffari
(74) *Attorney, Agent, or Firm* — Ogilvie Law Firm

(57) ABSTRACT

Garbage collectors and other software may utilize performant lock-free multithreaded software. Unitary lock-free updates to a set of variables involves an updating value Z, release barriers and acquire barriers that enforce orderings on code execution, and atomicity resulting from variable alignment. Conveyance is accomplished with a values placing step and a values retrieving step. Values placing replaces a non-updated value in a variable Var1 with Z, executes a release barrier, replaces the non-updated values of other variables with update values, executes another release barrier, and replaces Z with the Var1 update value. Values retrieving reads from Var1 into a variable DestVar1A, executes an acquire barrier, reads from the other variables into respective destination variables, executes another acquire barrier, reads from Var1 into a variable DestVar1B, and repeats if DestVar1A is Z or if DestVar1A and DestVar1B are unequal. This solution conveys the update values without locks, as a unit.

20 Claims, 4 Drawing Sheets

(56) References Cited

U.S. PATENT DOCUMENTS

| | | | |
|---|---|---|---|
| 7,389,395 B1 | 6/2008 | Garthwaite et al. | |
| 7,577,657 B2 | 8/2009 | Earhart | |
| 7,716,192 B2 | 5/2010 | Petrank et al. | |
| 8,566,368 B2 | 10/2013 | Massarenti | |
| 8,578,380 B1* | 11/2013 | Adams | G06F 9/526 |
| | | | 718/100 |
| 8,825,719 B2 | 9/2014 | Steensgaard et al. | |
| 9,208,081 B1 | 12/2015 | Dice et al. | |
| 9,489,406 B1 | 11/2016 | Shapiro et al. | |
| 9,519,668 B2 | 12/2016 | Kaldewey et al. | |
| 10,459,771 B2 | 10/2019 | Tsirkin | |
| 10,802,965 B2 | 10/2020 | Stephens et al. | |
| 2002/0161894 A1 | 10/2002 | Tapperson et al. | |
| 2003/0069905 A1 | 4/2003 | Dussud | |
| 2003/0174572 A1* | 9/2003 | Moir | G06F 9/52 |
| | | | 365/210.15 |
| 2005/0033781 A1 | 2/2005 | Dussud | |
| 2005/0044057 A1 | 2/2005 | Bluvshteyn et al. | |
| 2005/0160421 A1 | 7/2005 | Bluvshteyn et al. | |
| 2005/0235120 A1 | 10/2005 | Dussud | |
| 2006/0020766 A1 | 1/2006 | Dussud | |
| 2006/0085460 A1 | 4/2006 | Peschel-Gallee et al. | |
| 2006/0085494 A1 | 4/2006 | Dussud et al. | |
| 2006/0156152 A1 | 7/2006 | Trowbridge et al. | |
| 2006/0230387 A1 | 10/2006 | Prakriya et al. | |
| 2007/0011658 A1 | 1/2007 | Stephens | |
| 2007/0022268 A1 | 1/2007 | Stephens | |
| 2007/0094651 A1 | 4/2007 | Stephens et al. | |
| 2007/0094671 A1 | 4/2007 | Stephens et al. | |
| 2007/0100919 A1 | 5/2007 | Lee et al. | |
| 2007/0156967 A1 | 7/2007 | Bond et al. | |
| 2008/0172431 A1 | 7/2008 | Stephens et al. | |
| 2008/0281885 A1 | 11/2008 | Dussud | |
| 2008/0281886 A1 | 11/2008 | Petrank et al. | |
| 2009/0172305 A1* | 7/2009 | Shpeisman | G06F 9/3863 |
| | | | 711/154 |
| 2009/0222802 A1 | 9/2009 | Dussud et al. | |
| 2009/0254596 A1 | 10/2009 | Dussud et al. | |
| 2009/0259702 A1 | 10/2009 | Stephens et al. | |
| 2009/0265402 A1 | 10/2009 | Dussud et al. | |
| 2009/0292705 A1* | 11/2009 | McKenney | G06F 16/2329 |
| 2009/0300085 A1 | 12/2009 | Stephens et al. | |
| 2010/0070957 A1 | 3/2010 | Mariani et al. | |
| 2010/0082710 A1 | 4/2010 | Kilner et al. | |
| 2010/0114997 A1 | 5/2010 | Micic et al. | |
| 2010/0318584 A1 | 12/2010 | Krishnaprasad et al. | |
| 2010/0333107 A1* | 12/2010 | Omara | G06F 9/522 |
| | | | 718/106 |
| 2011/0173634 A1 | 7/2011 | Kottapalli et al. | |
| 2011/0191508 A1 | 8/2011 | Printezis et al. | |
| 2011/0202748 A1* | 8/2011 | Jacobi | G06F 9/3834 |
| | | | 712/225 |
| 2011/0264713 A1 | 10/2011 | Ylonen | |
| 2013/0091186 A1 | 4/2013 | Stephens et al. | |
| 2014/0032841 A1 | 1/2014 | Ahmad | |
| 2015/0227414 A1* | 8/2015 | Varma | G06F 11/0793 |
| | | | 714/47.1 |
| 2016/0239413 A1 | 8/2016 | Stephens et al. | |
| 2016/0306739 A1 | 10/2016 | Stephens et al. | |
| 2017/0116116 A1 | 4/2017 | Mittal et al. | |
| 2017/0116247 A1 | 4/2017 | Jonsson et al. | |
| 2017/0228223 A1 | 8/2017 | Bosworth et al. | |
| 2017/0262364 A1 | 9/2017 | Liden et al. | |
| 2017/0344473 A1 | 11/2017 | Gidra et al. | |
| 2017/0351490 A1 | 12/2017 | Wrighton et al. | |
| 2018/0004655 A1 | 1/2018 | Wilkinson et al. | |
| 2018/0074865 A1* | 3/2018 | Rungta | G06F 9/526 |
| 2018/0217779 A1 | 8/2018 | Stephens et al. | |
| 2018/0217927 A1 | 8/2018 | Stephens et al. | |
| 2018/0365080 A1* | 12/2018 | Wang | G06F 16/27 |
| 2019/0095323 A1 | 3/2019 | Gidra et al. | |
| 2020/0167512 A1* | 5/2020 | Chitra | G06Q 50/06 |
| 2020/0250084 A1 | 8/2020 | Stephens et al. | |
| 2020/0409839 A1 | 12/2020 | Stephens et al. | |
| 2021/0191859 A1 | 6/2021 | Stephens et al. | |

OTHER PUBLICATIONS

"International Search Report and Written Opinion Issued in PCT Application No. PCT/US20/060320", dated Feb. 23, 2021, 13 Pages.

"International Search Report and Written Opinion Issued in PCT Application No. PCT/US20/060813", dated Mar. 2, 2021, 11 Pages.

"International Search Report and Written Opinion Issued in PCT Application No. PCT/US2020/014535", dated May 15, 2020, 28 Pages.

"Cloud Gal Episode 2: Maoni Stephens", excerpt, full video available at <youtube.com/watch?v=OwpMnx15FLw>>, 1 page, May 22, 2017.

"Memory barrier", retrieved from en.wikipedia.org/wiki/Memory_barrier>>, 4 pages, Dec. 18, 2018.

"Disruptor: High performance alternative to bounded queues for exchanging data between concurrent threads", retrieved from lmax-exchange.github.io/disruptor/files/Disruptor-1.0.pdf>>, 11 pages, May 2011.

"Getting to Go: The Journey of Go's Garbage Collector", retrieved from blog.golang.org/ismmkeynotes>>, Jul. 12, 2018, 47 pages.

Hao Wu, et al., "A Study of Lock-Free Based Concurrent Garbage Collectors for Multicore Platform", retrieved from ncbi.nlm.nih.gov/pmc/articles/PMC4100292/>>, 17 pages, Apr. 23, 2014.

Y. Ossia, et al., "A Parallel, Incremental and Concurrent GC for Servers", retrieved from cs.ucsb.edu/~ckrintz/racelab/gc/papers/ossia-concurrent.pdf>>, 2002, 12 pages.

"f90_gc: Fortran Garbage Collector Module", retrieved from nag.com/nagware/np/r52_doc/f90_gc.html>>, no later than Jan. 19, 2019, 4 pages.

"Fundamentals of Garbage Collection", retrieved from docs.microsoft.com/en-us/dotnet/standard/garbage-collection/fundamentals>>, Mar. 29, 2017, 15 pages.

"Object-oriented programming", retrieved from en.wikipedia.org/wiki/Object-oriented_programming>>, Jan. 15, 2019, 14 pages.

"Full Garbage Collection vs. Major Garbage Collection", retrieved from eehittps:7/stackoverflow.com/questions/50081873/full-garbage-collection-vs-major-garbage-collection>>, Apr. 29, 2018, 5 pages.

"How to avoid garbage collection Stop the World Events in IBM Java/JVM", retrieved from stackoverflow.com/questions/44550678/how-to-avoid-garbage-collection-stop-the-world-events-in-IBM-java-jvm>>, Jun. 14, 2017, 6 pages.

"Java very large heap sizes", retrieved from ackoverflow.com/questions/214362/java-very-large-heap-sizes/9300779#9300779>>, Sep. 17, 2014, 30 pages.

"In MSVC, why do InterlockedOr and InterlockedAnd generate a loop instead of a simple locked instruction?", retrieved from stackoverflow.com/questions/47019366/in-msvc-why-do-interlockedor-and-interlockedand-generate-a-loop-instead-of-a-si>>, Oct. 30, 2017, 5 pages.

"Atomic vs. Non-Atomic Operations", retrieved from preshing.com/20130618/atomic-vs-non-atomic-operations/>>, Jun. 18, 2013, 13 pages.

"Compare-and-swap", retrieved from en.wikipedia.org/wiki/Compare-and-swap>>, 7 pages, Jul. 30, 2018.

"Lockless Programming Considerations for Xbox 360 and Microsoft Windows", retrieved from docs.microsoft. com/en-us/windows/win32/dxtecharts/lockless-programming#read-acquire-and-write-release-barriers>>, May 30, 2018, 22 pages.

Martinez, et al., "Speculative Synchronization: Applying Thread-Level Speculation to Explicitly Parallel Applications", retrieved from people.ece.cornell.edu/martinez/doc/asplos02.pdf>>, 2002, 12 pages.

Gidenstam, et al., "'Blocking without Locking' or Lfthreads: A lock-free thread library", retrieved from //pdfs.semanticscholar.org/f3b6/cb395b63b4335592f7162bc5bc004afcb310.pdf>>, Oct. 2007, 36 pages.

(56) References Cited

OTHER PUBLICATIONS

Rodriguez-Rivera, "Cyclic distributed garbage collection without global synchronization", retrieved from researchgate.net/publication/27232982_Cyclic_distributed_garbage_collection_without_global_synchronization>>, Nov. 1997, 19 pages.
Cohen, et al., "Efficient Memory Management for Lock-Free Data Structures with Optimistic Access", retrieved from cs.technion.ac.il/~erez/Papers/oa-spaa-15 pdf>>, 2015, 10 pages.
Namiot, "On lock-free programming patterns", retrieved from researchgate.net/publication/295858544_On_lock-free_programming_patterns>>, Jan. 2016, 9 pages.
"Intel Intrinsics Guide: _mm_sfence", retrieved from <software.intel.com/sites/landingpage/IntrinsicsGuide/#text=_mm_sfence&expand=5025>>, no later than Dec. 26, 2019, 2 pages.
"Intel Intrinsics Guide: _mm_lfence", retrieved from software.intel.com/sites/landingpage/IntrinsicsGuide/#text=_mm_lfence&expand=3297>>, no later than Dec. 26, 2019, 2 pages.
"Why is (or isn't?) SFENCE + LFENCE equivalent to MFENCE?", retrieved from ackoverflow.com/questions/27627969/why-is-or-isnt-sfence-lfence-equivalent-to-mfence>>, May 2018, 9 pages.
"The Intel x86 Memory Ordering Guarantees and the C++ Memory Model", retrieved from >justsoftwaresolutions.co.uk/threading/intel-memory-ordering-and-c++-memory-model html>>, Aug. 26, 2008, 2 pages.
"Intel and AMD Define Memory Ordering", retrieved from <justsoftwaresolutions.co.uk/threading/intel-and-amd-memory-ordering-defined.html>>, Sep. 17, 2007, 2 pages.
"Notice of Allowance issued in U.S. Appl. No. 16/268,041", dated Jun. 10, 2020, 11 Pages.
"Notice of Allowance Issued in U.S. Appl. No. 17/019,218", dated Dec. 9, 2021, 6 Pages.
"Non Final Office Action Issued in U.S. Appl. No. 17/019,218", dated Sep. 9, 2021, 10 Pages.
"Non Final Office Action Issued in U.S. Appl. No. 16/724,143", dated Jan. 18, 2022, 20 Pages.
"Notice of Allowance Issued in U.S. Appl. No. 16/724,143", dated Apr. 29, 2022, 9 Pages.

* cited by examiner

LOCK-FREE READING OF UNITARY VALUE SETS

BACKGROUND

Noon Many computer programs include multiple threads of execution. Sometimes the threads are designed to coordinate with one another as they execute. For example, a producer thread may produce an intermediate computation result or another item, which the producer puts into a queue. Then a consumer thread takes the item from the queue and does additional work with it. Separating the producer and consumer aspects of a job may allow one producer to serve items to multiple consumers when the producer is faster than any single consumer. Separating producer and consumer aspects may also facilitate program scaling, debugging, or upgrading.

In some software architectures, locks are used to permit or enforce cooperation between threads in a relatively simple way. A lock gives exclusive control of a computational resource. Locks can be used to enforce coordination that helps prevent data inconsistencies. If a producer P and two consumers C1 and C2 run without any coordination, then C1 or C2 or both could take invalid data from an item queue, e.g., by copying from an empty queue, because they are not coordinating with P to be sure P put an item in the queue. C1 and C2 could also both try to take the same item from the queue, because they are not coordinating with each other. But if there is a lock on the queue, then P can lock out C1 and C2 while P adds an item to the queue, and each consumer can lock out the other while the consumer with the lock takes the item from the queue.

Although locks are widely used, they can be inefficient; while a lock is being held only the thread that holds the lock can make unlimited progress. At some point other threads that use the lock will have done whatever they can do without holding the lock themselves, and will stop making progress. Moreover, if a thread that is holding the lock crashes, or deadlocks, or goes into an infinite loop, then the lock will not be released and the program will fail. Thus, although locks may be easier to understand, lock-free approaches to thread coordination might provide more efficient and reliable software, if they become available.

SUMMARY

Some embodiments described in this document provide improved performance of lock-free multithreaded software. In particular, some provide more efficient garbage collection by avoiding use of locks during compaction of marked memory segments. However, embodiments are not limited to garbage collection compaction, or even to garbage collection generally. Other contexts and other efficiencies may also be provided or employed.

Some embodiments perform lock-free conveyance of variable value updates as a unitary set. In some embodiments, a memory contains a set of variables having respective non-updated values, with the set including a variable Var1 and at least one other variable. A processor in operable communication with the memory is configured to convey variable value updates as a unitary set without lock reliance. Conveyance is accomplished with a values placing step and a values retrieving step. The values placing step performs the following actions in sequence: replacing a non-updated value in the variable Var1 with a different value Z that indicates updating is underway, executing a first release barrier, replacing the non-updated value of each other variable with a respective corresponding update value, executing a second release barrier, and replacing the value Z in the variable Var1 with a different value that is also an update value. The values retrieving step performs the following actions in sequence: reading from Var1 into a variable DestVar1A, executing a first acquire barrier, reading from other variables of the set into respective destination variables, executing a second acquire barrier, reading from Var1 into a variable DestVar1B, and repeating the foregoing retrieving step actions if DestVar1A has the value Z or if DestVar1A and DestVar1B contain different values from each other. In this manner, the embodiment conveys the update values through the variables to respective destination variables without lock reliance, and conveys the update values as a unitary set.

Conveyance as a "unitary set" means that after the values placing and the values retrieving are completed, the values in the destination variables will not include both a non-updated value and an update value. That is, non-updated values and update values are not mixed together in the variables after the conveyance is relied upon as done.

Also, one of skill will understand that the particular designations "Var1", "DestVar1A", "DestVar1B", and "Z" used here are merely for convenience. A given embodiment may use different identifiers or other designations when performing the same or equivalent conveyance actions.

Other technical activities and characteristics pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims as properly understood, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
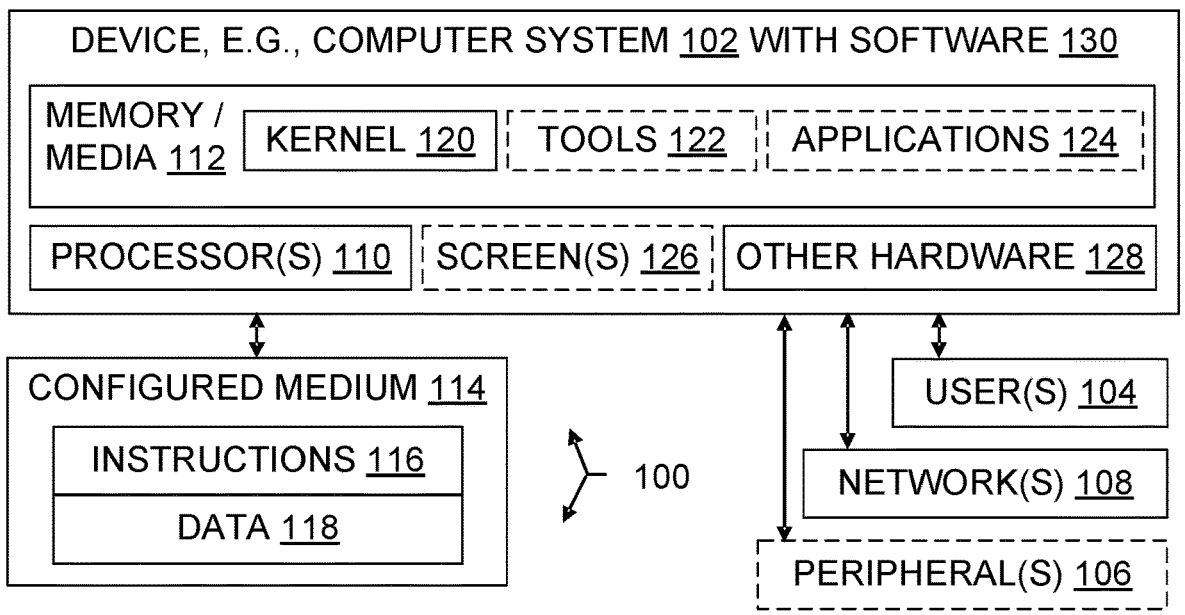
FIG. 1 is a block diagram illustrating computer systems generally and also illustrating configured storage media generally.

Innovations may expand beyond their origins, but understanding an innovation's origins can help one more fully appreciate the innovation. In the present case, some teachings described herein were motivated by technical challenges faced by Microsoft innovators who were working to improve the performance of garbage collection. In particular, one technical challenge is to how to reduce "stop-the-world" time during garbage collection, which is effectively the time during which a garbage collection thread holds a lock on all areas of managed memory. Another technical challenge is how to read the correct pair of characteristic values associated with a digital item when locks are not used.

These and other challenges are illustrated by the following scenario. Assume a computing system manages memory for application program threads at least in part by using automatic garbage collection. A garbage collection thread automatically runs in the system from time to time in order to identify pieces of memory that were previously used by an application program but are no longer being used. After they are identified, these pieces of memory are automatically placed back into a pool of available memory, from which they can be re-allocated and re-used by an application program; this could be the same application program that used them before, or it could be another program, or both.

Assume also that to increase the size of the memory areas that are available for re-allocation, segments of memory that are still in use are relocated to make them more contiguous. That is, the data D that is stored in a memory segment X is copied to another memory segment Y, after which the memory in segment X can be reused and overwritten without corrupting or losing the data D. This copying involves variables that contain the address of X, the address of Y, and the size of D, because memory contents the size of D starting at the address of X will be copied over to memory starting at the address of Y, if all goes well.

In this scenario, the address of X and the length of D are paired values; changing one of them without changing the other appropriately can corrupt data, crash a thread, or cause other problems. But uncoordinated threads can create inconsistency by causing partial updates within paired values. For instance, a variable containing D might be changed to contain Dnew—the size of a different item—after a thread reads the address of X but before the thread reads the variable that now contains Dnew. As a result, code that should copy D amount of data from X will instead copy Dnew amount of data. Similarly, other code that relies on the wrongly updated variable to indicate the size of data in segment X, which is actually D not Dnew, will also err by treating Dnew as the size of the data.

More generally, two or more variables in a multithreaded program may form a set such that when any variable in the set is updated, all of the other variables in the set should also be updated for consistency ("updating" may change a variable's value, or it may simply confirm that the variable's value will be the same after the update). No thread that reads the variables should read a mixture of updated values and not-yet-updated values. For update purposes, the variables should be treated as a unit, so the set may be referred to as a "unitary set". The variables in a unitary set may also be described simply as "related", when the desire to avoid partial updates is clear from context. Unitary variable sets may occur not only in garbage collection, but in a wide variety of other multithreaded contexts as well.

One way to avoid undesired partial updates is to use a lock on the set of variables being updated. A thread which performs an update begins by taking the lock. Then it updates all the variables in the set. Finally, it releases the lock. A thread that reads the variables likewise takes the lock, reads all the variables in the set, and then releases the lock.

However, locks are inefficient because only the thread that holds the lock can be relied on to make progress. Threads holding a lock may also fail to free the lock, which can bring processing to a snail's pace or stop it entirely.

Fortunately, lock-free updates to a set of related variables can also be implemented and executed, using teachings herein. In some embodiments, the lock-free conveyance of a unitary set of update values is accomplished using a mixture of (a) a value Z that differs from all legal update values, (b) release and acquire barriers that enforce orderings on code statement execution, and (c) atomicity resulting from natural alignment of variables. Details of various embodiments are described further below.

Operating Environments

With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud. An individual machine is a computer system, and a group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A screen 126 may be a removable peripheral 106 or may be an integral part of the system 102. A user interface may support interaction between an embodiment and one or more human users. A user interface may include a command line interface, a graphical user interface (GUI), natural user interface (NUI), voice command interface, and/or other user interface (UI) presentations, which may be presented as distinct options or may be integrated.

System administrators, network administrators, cloud administrators, security analysts and other security personnel, operations personnel, developers, testers, engineers, auditors, and end-users are each a particular type of user 104. Automated agents, scripts, playback software, devices, and the like acting on behalf of one or more people may also be users 104, e.g., to facilitate testing a system 102. Storage devices and/or networking devices may be considered peripheral equipment in some embodiments and part of a system 102 in other embodiments, depending on their detachability from the processor 110. Other computer systems not shown in FIG. 1 may interact in technological ways with the computer system 102 or with another system embodiment using one or more connections to a network 108 via network interface equipment, for example.

Each computer system 102 includes at least one processor 110. The computer system 102, like other suitable systems, also includes one or more computer-readable storage media 112. Storage media 112 may be of different physical types. The storage media 112 may be volatile memory, non-volatile memory, fixed in place media, removable media, magnetic media, optical media, solid-state media, and/or of other types of physical durable storage media (as opposed to merely a propagated signal or mere energy). In particular, a configured storage medium 114 such as a portable (i.e., external) hard drive, CD, DVD, memory stick, or other removable non-volatile memory medium may become functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se or mere energy under any claim pending or granted in the United States.

The storage medium 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processors 110 (e.g., CPUs, ALUs, FPUs, TPUs and/or GPUs), memory/storage media 112, and displays 126, an operating environment may also include other hardware 128, such as batteries, buses, power supplies, wired and wireless network interface cards, for instance. The nouns "screen" and "display" are used interchangeably herein. A display 126 may include one or more touch screens, screens responsive to input from a pen or tablet, or screens which operate solely for output. In some embodiments, peripherals 106 such as human user I/O devices (screen, keyboard, mouse, tablet, microphone, speaker, motion sensor, etc.) will be present in operable communication with one or more processors 110 and memory.

In some embodiments, the system includes multiple computers connected by a wired and/or wireless network 108. Networking interface equipment 128 can provide access to networks 108, using network components such as a packet-switched network interface card, a wireless transceiver, or a telephone network interface, for example, which may be present in a given computer system. Virtualizations of networking interface equipment and other network components such as switches or routers or firewalls may also be present, e.g., in a software defined network or a sandboxed or other secure cloud computing environment. In some embodiments, one or more computers are partially or fully "air gapped" by reason of being disconnected or only intermittently connected to another networked device or remote cloud. In particular, lock-free update values conveyance functionality taught herein could be installed and maintained on an air gapped system. A given embodiment may also communicate technical data and/or technical instructions through direct memory access, removable non-volatile storage media, or other information storage-retrieval and/or transmission approaches.

One of skill will appreciate that the foregoing aspects and other aspects presented herein under "Operating Environments" may form part of a given embodiment. This document's headings are not intended to provide a strict classification of features into embodiment and non-embodiment feature sets.

One or more items are shown in dashed outline form in the Figures, or listed inside parentheses, to emphasize that they are not necessarily part of the illustrated operating environment or all embodiments, but may interoperate with items in the operating environment or some embodiments as discussed herein. It does not follow that items not in dashed outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

More about Systems

Figure 2:
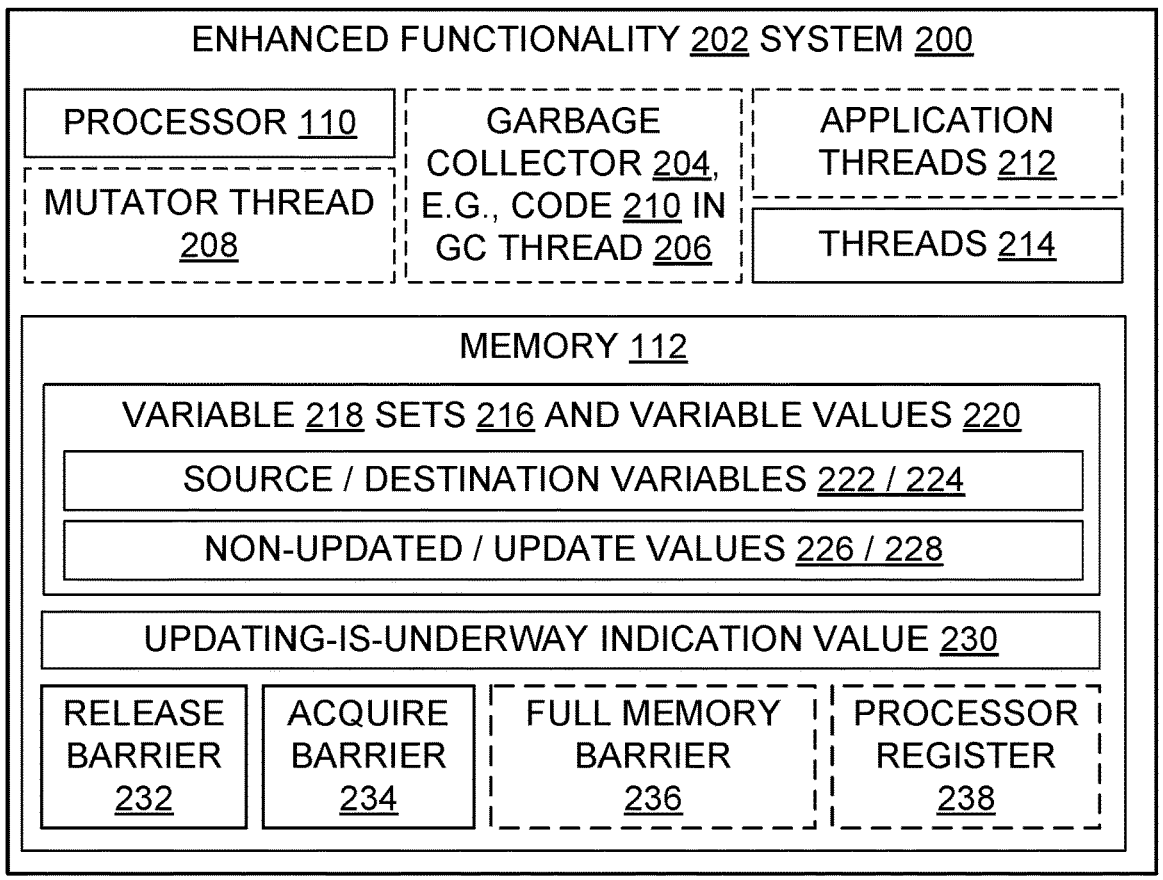
FIG. 2 is a block diagram illustrating some aspects of some computer systems that have enhanced update values conveyance functionality.

FIG. 2 illustrates some aspects of some systems 200, which are systems 102 enhanced with at least some of the functionality 202 taught herein for lock-free update values conveyance. In particular, the illustrated enhanced system 200 may include a garbage collector (GC) 204 installed in a GC thread 206 or in GC marking phase code 210 or another location. Alternately, or in addition, the functionality 202 may be implemented in mutator threads 208, in application threads 212, or in other kinds of threads 214, such as in a combination of one or more of the following: kernel 120 threads, device driver threads, application threads, system service threads, daemons, garbage collection threads, user interface threads, producer threads, or consumer threads.

The illustrated system 200 has a memory 112, which includes at least one unitary set 216 of related variables 218. Memory 112 may include RAM, disk, or other memory media, and in particular some implementations use one or more processor 110 registers 238 as memory that holds variable value(s) 220. Each variable 218 holds a respective value 220; different variables 218 may hold the same value or hold different values, at various times. Variables 218 include source variables 222 and destination variables 224.

Values 228 are safely and efficiently conveyed through the source variables 222 to respective destination variables 224, using lock-free update values conveyance functionality 202. That is, update values 228 are written to the source variables 222, read from the source variables 222, and written to respective destination variables 224 without mixing pre-update values 226 and post-update values 228 in the destination variables 224, and without reliance on a lock to prevent such mixing. Pre-update values 226 are also referred to herein as "non-updated values" 226.

In this enhanced system 200, an updating-is-underway indication value 230 is used, as the name suggests, to indicate that updating of source variables 222 is underway. The updating-is-underway indication value 230 is also referred to herein for convenience as "Z".

In this enhanced system 200, a release barrier 232 and an acquire barrier 234 are used to enforce orderings on some thread statement executions.

A release barrier 232 prevents operation reordering, in that store operations shown in the program's source code listing before the barrier 232 will actually be executed before the release barrier. Listing order is sometimes called "program order". Specifically, all results of stores preceding the release barrier will be visible before results of any stores after the barrier 232, and stores after the barrier 232 will not be executed before the barrier 232. Release barriers 232 are sometimes called "store barriers" 232, and barriers (232 or 234) are sometimes called "fences". As a mnemonic, a release barrier indicates that all values will be ready for release, because they will have been stored before the release barrier is encountered. In that sense, at least, the program's actual execution order will conform with the program's listing order.

An acquire barrier 234 also prevents operation reordering, in that all the load operations shown in the program's listing (in program order) will be executed before the acquire barrier. Acquire barriers 234 are sometimes called "load barriers" 234. An acquire barrier indicates that values will be acquired (loaded) before the acquire barrier is encountered. Specifically, all loads preceding the barrier 234 are globally visible before any load following the barrier 234.

Barrier effects may be implemented in various ways. Some environments 100 support indicating barriers expressly in the source code as a statement using an identifier such as "barrier" or "fence". Alternately or in addition, one may use a feature such as the C++ memory_order_release or memory_order_acquire feature operating on variables, e.g., with code such as:
Var1.store(Z, std::memory_order_release);
Var2.store(Var2UpdateValue, std::memory_order_release);
Var1.store(Var1UpdateValue, std::memory_order_release);

A full memory barrier 236 is one that achieves both what a release barrier achieves and what an acquire barrier achieves. Although not entirely the same as a release barrier plus an acquire barrier, with respect to update value conveyance as taught herein a full memory barrier may be viewed as capable of operating like a release barrier or like an acquire barrier or both. In this sense, the full memory barrier "operates" as a release barrier or as an acquire barrier. Although less efficient, a full memory barrier 236 may be used in some implementations in place of the release barrier 232 or in place of the acquire barrier 234, or in place of both.

Figure 3:
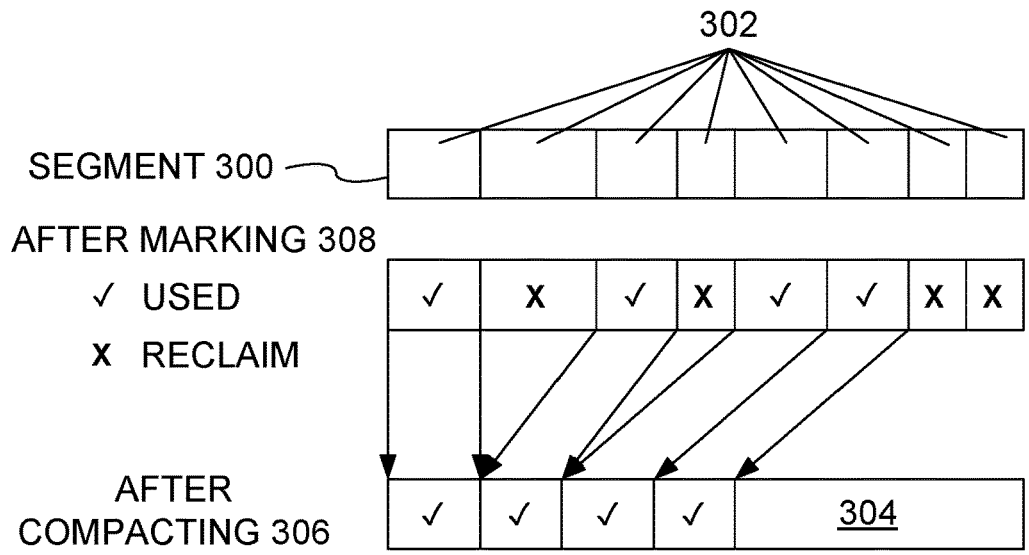
FIG. 3 is diagram illustrating aspects of memory status at different points in time during garbage collection.
Figure 4:
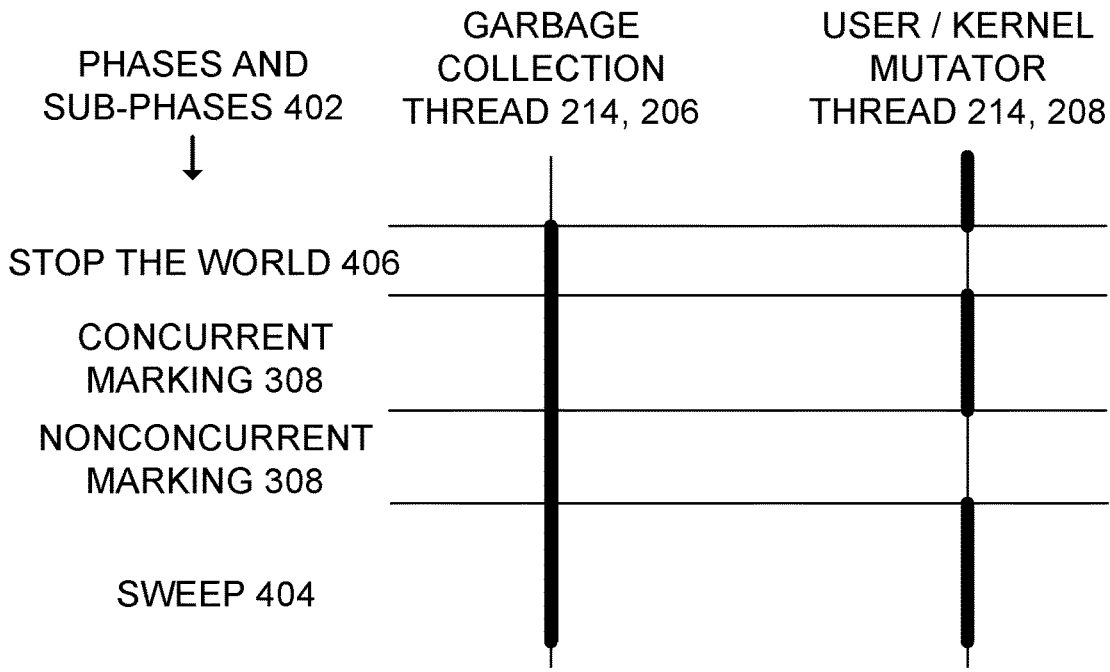
FIG. 4 is a diagram illustrating concurrent execution of a garbage collection thread and a mutator thread.

FIGS. 3 and 4 further illustrate some aspects of garbage collection. Some of these aspects are familiar, or occur in familiar garbage collection activities, but their relevance to teachings herein becomes clear only after one understands innovative garbage collection marking with lock-free update values conveyance. Garbage collection provides examples of variable sets 216, but the lock-free update values conveyance functionality 202 is not limited to use in garbage collection, and garbage collection can also be implemented without functionality 202.

As illustrated in FIG. 3, garbage collection code operates on segments 300 of memory 112 which are divided by program execution into contiguous areas 302. A given area 302 may be clearly in use by one or more mutator threads, as indicated by the check mark symbol in FIG. 3, and hence be off-limits for reclamation. A given area 302 may also be clearly not in use, and hence reclaimable, as indicated by the X marks in FIG. 3. The reclaimability of an area 302 may also be undetermined.

Garbage collection generally involves tracing addresses or otherwise determining a memory area's in-use-or-not status, and marking 308 the memory area (or a data structure that represents the areas) accordingly. Some garbage collectors leave the marked areas in place where they are found, and then programs 130 are allocated memory out of the reclaimable areas. This approach is taken in so-called mark-sweep garbage collection algorithms. Other garbage collectors relocate used areas or relocate reclaimable areas, or do both, in order to compact 306 together multiple areas that have the same reclaimability status. This approach, known as a mark-compaction, often produces larger reclaimable areas 304 than the mark-sweep approach but has greater complexity due to the requirement of correctly updating addresses to match the compaction results. Correct address updating may be implemented using functionality 202, so that segment addresses and segment sizes are only updated as unitary pairs.

FIGS. 3 and 4 help illustrate phases or sub-phases 402 of garbage collection, and their relationship to concurrency when there is some concurrency.

These figures show some specific phases in a garbage collection cycle, including a marking phase 308, a sweep phase 404, and a compacting phase 306. During marking 308, reachable objects or other non-reclaimable areas of memory are marked, either in place or in a data structure which represents them. During the sweep 404, reclaimable objects are cleared from the heap, e.g., by being placed in a pool for reallocation. During compacting 306, reclaimable areas are placed together; this may also be viewed as placing together used areas (which are not currently reclaimable). A given garbage collector does not necessarily perform each phase, e.g., sometimes compaction 306 is omitted.

A simple approach to garbage collection is to suspend everything except the garbage collector while the garbage collector marks 308 memory areas as in-use or reclaimable. However, such a full-on "stop the world" approach is not acceptable in most systems because it degrades user program performance too severely. Accordingly, a garbage collector may be designed with a goal of limiting long "stop the world" sub-phases 406 by allowing concurrent execution of a garbage collection thread 206 and any mutator thread(s) 208. The marking phase may be sub-divided into a concurrent portion and a nonconcurrent portion. Usage of functionality 202 tends to increase concurrency during marking, and hence tends to improve the performance of user code that is subject to garbage collection. Although concurrency involves at least two threads overlapping in execution at least part of the time, concurrency does not require that both threads always start together or suspend together or stop together.

Figure 5:
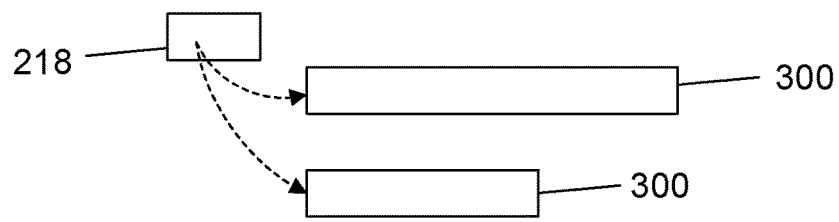
FIG. 5 is a diagram illustrating aspects of objects in memory.
Figure 9:
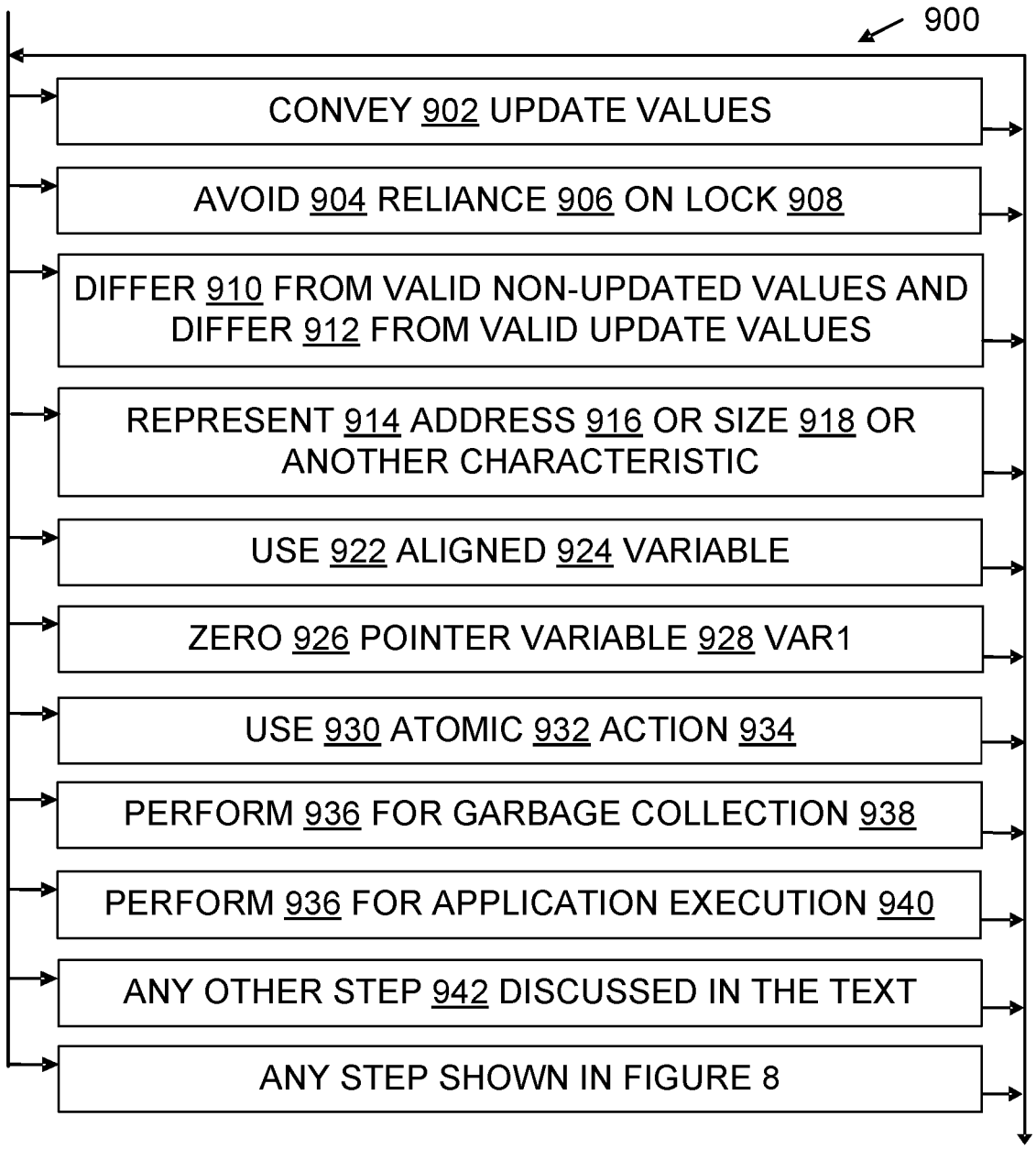
FIG. 9 is a flowchart further illustrating steps in some lock-free update values conveyance methods.

FIGS. 5 and 9 illustrate a pointer variable 218, 928 which takes two values at different times. As this variable is a pointer variable, the values 220 taken by it are addresses of respective memory segments 300, and are indicated in FIG. 5 by dashed line arrows pointing to the memory segments. In this example, each memory segment is a different size, as indicated qualitatively in FIG. 5. FIG. 5 is not intended to be to scale. The address and the size of any particular given segment 300 are paired variables, that is, they belong to the same unitary set 216. FIG. 5 shows two segments 300; each segment has its own address and its own size.

Figure 6:
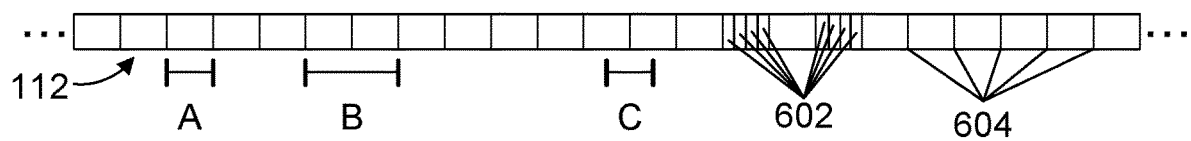
FIG. 6 is a diagram illustrating aspects of variable alignment.

FIG. 6 illustrates variable alignment. Memory 112 contains individually addressable units 602 such as bytes. In many systems 102, a single processor 110 instruction can read or write more than one byte at a time. For example, a 32-bit (4 byte) data move instruction reads or writes 4 bytes of data in an atomic instruction ("atomic" meaning indivisible from the point of view of a thread), and a 64-bit data move instruction reads or writes 8 bytes of data in a single instruction. However, in these examples the data I/O is atomic in part because it reads or writes memory that is aligned on a boundary 604 that is a multiple of the multi-byte data's size. Such alignment is sometimes called "natural" alignment. Thus, 4-byte data variables 218 are naturally aligned at addresses 916 that are multiples of 4 bytes, and 8-byte data variables 218 are naturally aligned at addresses 916 that are multiples of 8 bytes.

In FIG. 6, variable A is a 4-byte variable, and is naturally aligned because it begins and ends on addresses that are integer multiples of 4 bytes. Similarly, 8-byte variable B is naturally aligned because it begins and ends on addresses that are integer multiples of 8 bytes. By contrast, 4-byte variable C is not naturally aligned, because it does not begin and end on addresses that are integer multiples of 4 bytes.

Figure 7:
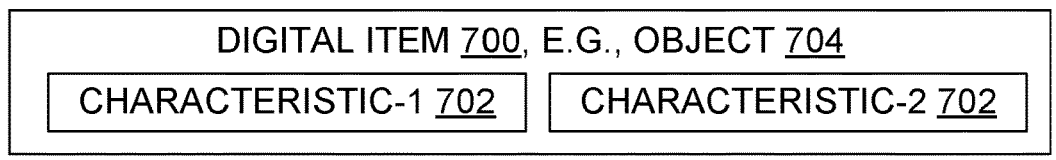
FIG. 7 is a diagram illustrating aspects of a digital item.

FIG. 7 illustrates a digital item 700 which has two paired characteristics 702. For example, in the garbage collection scenario discussed above, an allocated object 700, 704 has an address characteristic 702 and also has a size characteristic 702. More generally, a digital artifact 700 may have two or more characteristics 702 that are assumed to be correlated with one another, and hence suitable for treatment as unitary set variables. Many examples are possible. In an inventory database record, for instance, the number of widgets in stock and the total value of widgets in stock are paired; if one is updated, the other should also be updated for consistency. Also, in a database record that includes a city and a postal code, if one changes then the other should also be updated, even if the "update" merely confirms that the current value is correct.

In particular, some embodiments use or provide an update values conveyance functionality-enhanced system, such as system 200 or another system 102 that is configured for lock-free conveyance of variable value updates as a unitary set as taught herein. The enhanced system 200 includes a memory 112, and a processor 110 in operable communication with the memory. The memory contains a set of variables having respective non-updated values, the set including a variable Var1 and at least one other variable. The processor 110 is configured to perform steps for conveying variable value updates as a unitary set without lock reliance, the steps including a values placing step and a values retrieving step.

In this embodiment, the values placing step includes performing the following actions 934 in sequence: replacing a non-updated value in the variable Var1 with a different value Z that indicates updating is underway, executing a first release barrier, replacing the non-updated value of each other variable with a respective corresponding update value, executing a second release barrier, and replacing the value Z in the variable Var1 with a different value that is also an update value. "In sequence" means in the order shown, but intervening additional actions may also be performed.

In this embodiment, the values retrieving step includes performing the following actions 934 in sequence: reading from Var1 into a variable DestVar1A, executing a first acquire barrier, reading from other variables of the set into respective destination variables, executing a second acquire barrier, reading from Var1 into a variable DestVar1B, and repeating the foregoing retrieving step actions if DestVar1A has the value Z or if DestVar1A and DestVar1B contain different values from each other.

This system conveys the update values through the variables to respective destination variables without lock reliance. Also, this system conveys the update values as a unitary set, in that after the values placing step and the values retrieving step are completed the values in the destination variables will not include both a non-updated value and an update value.

In some embodiments, the value Z is different 910 from all valid non-updated values and is also different 912 from all valid update values.

In some embodiments, functionality 202 enhances garbage collection. For example, in some embodiments one of the non-updated values 226 represents 914 an address 916 of a free space area 304 and the corresponding update value 228 represents 914 an address 916 of an allocated item 700, and another of the non-updated values 226 represents 914 a size 918 of the free space area 304 and the corresponding update value 228 represents 914 a size 918 of the allocated item 700.

In some embodiments, update values are stored in RAM, but they might also be used on the fly, e.g., update values 228 might be read into a register 238 and not be copied to RAM. Accordingly, in some embodiments the destination variables 224 include at least one of the following: a location in a random access memory 112, or a register 238 in a processor 110.

Some embodiments utilize less performant barriers than others. In some, at least one of the following conditions holds: at least one of the release barriers 232 is implemented as part of a full memory barrier 236, or at least one of the acquire barriers 234 is implemented as part of a full memory barrier 236. But in some embodiments, the values placing step and the values retrieving step are each performed without relying on any full memory barrier 236. A full memory barrier 236 is any memory barrier which operates both as a release barrier and as an acquire barrier.

In some embodiments, performance is improved by use of naturally aligned 924 variables 218. In particular, in some the source variables 222 and the destination variables 224 are each aligned on a 4-byte boundary.

Other system embodiments are also described herein, either directly or derivable as system versions of described processes or configured media, informed by the extensive discussion herein of computing hardware.

Although specific architectural examples are shown in the Figures, an embodiment may depart from those examples. For instance, items shown in different Figures may be included together in an embodiment, items shown in a Figure may be omitted, functionality shown in different items may be combined into fewer items or into a single item, items may be renamed, or items may be connected differently to one another.

Examples are provided in this disclosure to help illustrate aspects of the technology, but the examples given within this document do not describe all of the possible embodiments. A given embodiment may include additional or different technical features, mechanisms, action sequences, data structures, or specific functionalities for instance, and may otherwise depart from the examples provided herein.

Processes (a.k.a. Methods)

Figure 8:
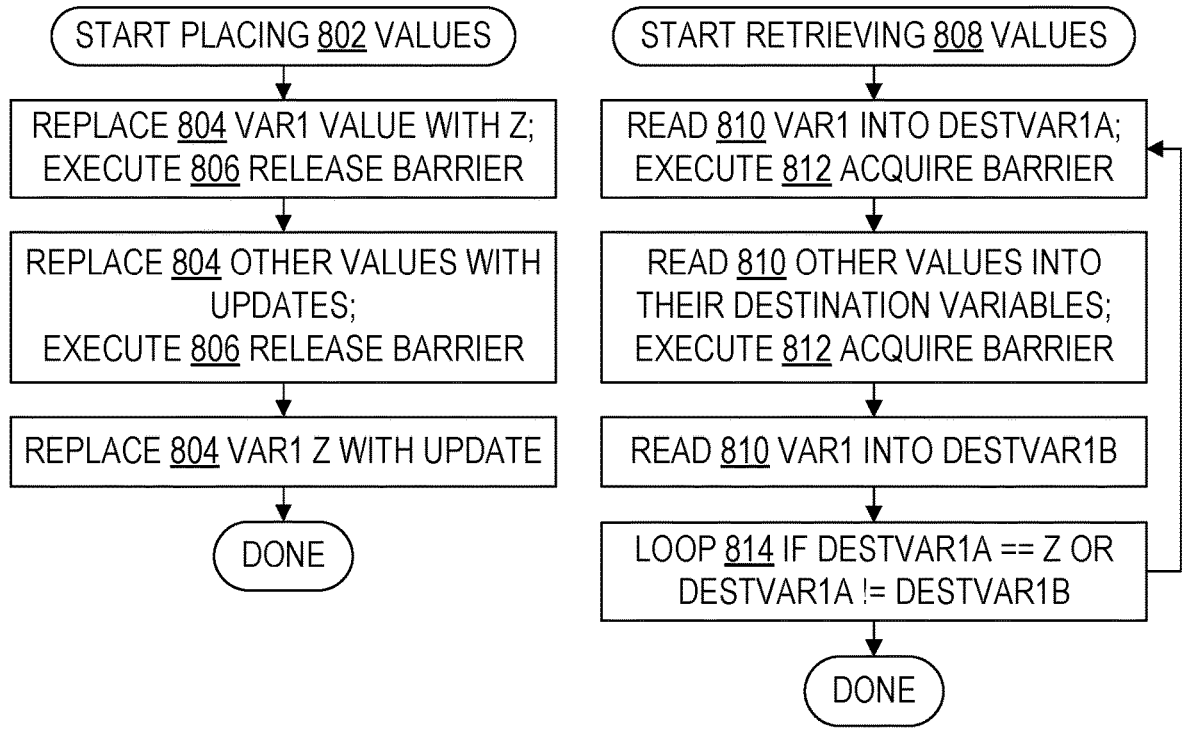
FIG. 8 is a flowchart illustrating steps in some lock-free update values conveyance methods.

FIG. 8 illustrates families of methods 800 that may be performed or assisted by an enhanced system, such as system 200, or another functionality-enhanced system as taught herein. FIG. 9 further illustrates value conveyance methods (which may also be referred to as "processes" in the legal sense of that word) that are suitable for use during operation of a system which has innovative functionality taught herein. FIG. 9 includes some refinements, supplements, or contextual actions for steps shown in FIG. 8. FIG. 9 also incorporates steps shown in FIG. 8. Technical processes shown in the Figures or otherwise disclosed will be performed automatically, e.g., by cooperating threads 214, unless otherwise indicated. Processes may also be performed in part automatically and in part manually to the extent action by a human administrator or other human person is implicated, e.g., in some embodiments a developer may specify the update values 228 to be conveyed. No process contemplated as innovative herein is entirely manual. In a given embodiment zero or more illustrated steps of a process may be repeated, perhaps with different parameters or data to operate on. Steps in an embodiment may also be done in a different order than the top-to-bottom order that is laid out in FIGS. 8 and 9. Steps may be performed serially, in a partially overlapping manner, or fully in parallel. In particular, the order in which control flowchart 800 action items or control flowchart 900 action items are traversed to indicate the steps performed during a process may vary from one performance of the process to another performance of the process. The chart traversal order may also vary from one process embodiment to another process embodiment. Steps may also be omitted, combined, renamed, regrouped, be performed on one or more machines, or otherwise depart from the illustrated flow, provided that the process performed is operable and conforms to at least one claim.

Some embodiments use or provide a method supporting lock-free conveyance of variable value updates as a unitary set, a values placing step 802 which performs the following actions 934 in sequence: replacing 804 a non-updated value in a variable Var1 of a set of variables with a different value Z that indicates updating is underway; executing 806 a first release barrier; replacing 804 non-updated values of other variables of the set with respective update values; and executing 806 a second release barrier. These embodiments also include replacing 804 the value Z in the variable Var1 with a different value that is also an update value. This method places 802 update values in the source variables 222 without lock reliance. This method also places 802 the update values as a unitary set 216, in that after the values placing step actions are completed the values in the source variables 222 will not include both a non-updated value 226 and an update value 228.

In some embodiments, the method further includes a values retrieving step 808 which performs the following actions 934 in sequence: reading 810 from Var1 into a variable DestVar1A; executing 812 a first acquire barrier; reading 810 from other variables of the set into respective destination variables; executing 812 a second acquire barrier; reading 810 from Var1 into a variable DestVar1B, and repeating 814 the foregoing retrieving step actions if DestVar1A has the value Z or if DestVar1A and DestVar1B contain different values from each other. This method retrieves 808 the update values from the variables into respective destination variables without lock reliance, and conveys the update values as a unitary set in that after the values placing step and the values retrieving step are completed the values in the destination variables will not include both a non-updated value and an update value.

In some embodiments, the values placing step 802 is performed by a thread P and the values retrieving step 808 is performed by a different thread R. The designations "P" and "R" are for convenience only; an embodiment may also or instead designate threads using other identifiers.

Although the embodiments are not strictly limited to examples involving garbage collection, aspects of the teachings herein did originate in the context of efforts to improve the performance of garbage collection. In some embodiments, one of the non-updated values 226 represents an address of a free space area and the corresponding update value 228 represents an address of an allocated item, and another of the non-updated values 226 represents a size of the free space area and the corresponding update value 228 represents a size of the allocated item. Each address value is to be unitary with the corresponding size value, so the variable that holds the addresses is in a unitary set with the variable that holds the sizes.

Somewhat more generally, it is contemplated that in many embodiments one of the unitary variables being updated will be a pointer that is also used to indicate whether all the variables have been updated yet. In some of these, Var1 is a pointer variable 928 and replacing 804 the non-updated value in the pointer variable Var1 with the value Z includes zeroing 926 (nulling) Var1.

Although teachings may be applied to unitary sets 216 of three or more variables 218, it is contemplated that in many embodiments a unitary set will consist of a pair of variables. In particular, in some embodiments exactly two variables 218 are being updated and they are closely related to each other because they both refer to the same digital item 700. The digital item 700 involved could be a free space area, or an object, for example, and the item characteristics 702 represented by the unitary variables could be item addresses or other identifiers, item lengths or other sizes, for example. That is, in some embodiments, the set 216 of variables consists of two variables, the method executes in a device 102 containing a digital item 700, and each of the variables in the set 216 represents a respective characteristic 702 of the digital item.

Some embodiments use a less performant full memory barrier 236, while others do not. In some embodiments the values placing step 802 is performed without implementing any of the release barriers 232 as part of a full memory barrier. In some of these, and in some other embodiments as well, the values retrieving step 808 is performed without implementing any of the acquire barriers 234 as part of a full memory barrier. In some systems, the release barriers or the acquire barriers or both may be implicit. For example, in some x/86 and x64 systems barriers are not explicitly inserted for aligned loads or aligned stores. Explicitly inserted release barriers may be omitted unless one is doing non-temporal stores.

In some embodiments, each replacing action 804 used 930 is individually atomic 932. In some, each reading action 810 used 930 is individually atomic 932. The individual actions 804 or 810 or both may be atomic, for example, as a result of the variables being naturally aligned 924 in a system 200.

Configured Storage Media

Some embodiments include a configured computer-readable storage medium 112. Storage medium 112 may include disks (magnetic, optical, or otherwise), RAM, EEPROMS or other ROMs, and/or other configurable memory, including in particular computer-readable storage media (which are not mere propagated signals). The storage medium which is configured may be in particular a removable storage medium 114 such as a CD, DVD, or flash memory. A general-purpose memory, which may be removable or not, and may be volatile or not, can be configured into an embodiment using items such as unitary sets 216, source variables 222, destination variables 224, non-updated values 226, update values 228, an updating-is-underway indication value 230, release barriers 232, acquire barriers 234, alignment boundaries 604, threads 214, and conveyance processes 800, in the form of data 118 and instructions 116, read from a removable storage medium 114 and/or another source such as a network connection, to form a configured storage medium. The configured storage medium 112 is capable of causing a computer system 102 to perform technical process steps for unitary values conveyance, as disclosed herein. The Figures thus help illustrate configured storage media embodiments and process (a.k.a. method) embodiments, as well as system and process embodiments. In particular, any of the process steps illustrated in FIG. 8 or 9, or otherwise taught herein, may be used to help configure a storage medium to form a configured storage medium embodiment.

Some embodiments use or provide a computer-readable storage medium 112, 114 configured with data 118 and instructions 116 which upon execution by at least one processor 110 cause a computing system to perform a method supporting lock-free conveyance of variable value updates as a unitary set. This method includes a values retrieving step 808 which performs the following actions in sequence: reading 810 from a variable Var1 of a set of variables into a variable DestVar1A; executing 812 a first acquire barrier; reading 810 from other variables of the set into respective destination variables; executing 812 a second acquire barrier; reading 810 from Var1 into a variable DestVar1B, and repeating 814 the foregoing retrieving step actions if DestVar1A has a value Z that indicates updating is underway, or if DestVar1A and DestVar1B contain different values from each other. This method retrieves 808 update values 228 from the variables 222 into respective destination variables 224 without lock reliance. This method retrieves 808 the update values as a unitary set 216, in that after the values retrieving step actions are completed the values in the destination variables will not include both a non-updated value and an update value.

In some embodiments, the method further includes a values placing step 802 which performs the following actions in sequence: replacing 804 a non-updated value in Var1 with the value Z that indicates updating is underway; executing 806 a first release barrier; replacing 804 non-updated values of other variables of the set with respective update values; executing 806 a second release barrier; and replacing 804 the value Z in the variable Var1 with a different value that is also an update value. This method places 802 update values in the variables without lock reliance. This method places the update values as a unitary set 216, in that after the values placing step actions are completed the values in the variables will not include both a non-updated value and an update value.

In some embodiments, the value Z 230 which indicates updating is underway also represents one of the following: zero, not-a-number, or negative one. For instance, Z may be zero (NULL) when the Var1 variable is a pointer variable 928, i.e., a variable that is designed to hold memory 112 addresses 916. Z may be not-a-number (e.g., NaN) when the Var1 variable is a numeric variable, e.g., a variable that is designed to hold representations of integer values or floating point numbers. Z may be negative one when the Var1 variable is designed to hold non-negative values, e.g., real world or simulated quantities or measurements that are zero or greater.

In some embodiments, the method is performed by garbage collection software 204. In some, the method is performed by multithreaded application 124 software. However, the teachings may also be applied in other computing contexts, e.g., in a kernel 120 for purposes other than garbage collection.

Additional Details, Examples, and Observations

Additional support for the discussion above is provided below. For convenience, this additional support material appears under various headings. Nonetheless, it is all intended to be understood as an integrated and integral part of the present disclosure's discussion of the contemplated embodiments.

Some embodiments support reading the correct pair of values in a given scenario, without global synchronization. Some scenarios involve a transition state that goes from one pair of values to another, e.g., (MT1, L1) to (MT2, L2). In this context "MT" originated as an abbreviation of "method table" and "L" originated as an abbreviation of "length" because the variables involved method addresses in a table and memory area lengths (sizes). But one of skill informed by the disclosure herein can readily generalize, both the other kinds of unitary variable sets, and to unitary variable sets with more than two variables.

Continuing the particular garbage collection example, assume there is a GC thread that looks at objects, including at times objects 704 that are being constructed. Some embodiments use an intermittent zero state so that other threads, with careful reads and checks as taught herein, will never observe (MT1, L2) or (MT2, L1), even though the embodiment avoids using global synchronization. Other approaches may disadvantageously use global synchronization, e.g., by taking an exclusive lock or suspending another thread for the duration of object construction, each of which would add significant performance overhead. By contrast, the solutions taught herein are very lightweight.

In some embodiments, object construction starts with (MT1, L1), a state which denotes a free area that an allocated object will be constructed from. After construction, the state variable's values will represent the constructed object as (MT2, L2).

In terms of pseudocode, the construction process value placing portion may be described thus:
Begin as: (MT1, L1)
Transition to state S1: (0, L1)
Release barrier (to make sure the previous write happens before the next one)
Transition to state S2: (0, L2)
Release barrier (to make sure the previous write happens before the next one)
End as: (MT2, L2).

A values consumption happens on a GC thread that reads the object info in order to calculate the size correctly. This code reads either (MT1, L1) or (MT2, L2) but not the other two combinations—inconsistent update combinations that mix a non-updated value with an update value: (MT1, L2), (MT2, L1).

In terms of pseudocode, in which MT is the variable holding the values MT1 and MT2 at various times, and L is the variable holding the values L1 and L2 at various times, "←" indicates an assignment, "!=" indicates not equal, "=" indicates equality, and "Loop" is a jump label, the construction process value retrieving (consuming) portion may be described thus:

Loop:
MT1←Read (MT)
Acquire barrier (to make sure the next read happens after the previous one)
L←Read(L)
Acquire barrier (to make sure the next read happens after the previous one)
MT2←Read(MT)
if (MT1 !=MT2) goto Loop
if (MT1==0) goto Loop The reader will not read MT1 with L2 by reading MT twice, because of the ordering imposed; a second read will either see 0 or MT2. A second read could also read MT1 but then the code would also read L1 and exit the loop. Also, the reader will not read MT2 and L1 because L1 is written earlier than MT2 and the reader will observe the ordering imposed by the barriers.

Technical Character

The technical character of embodiments described herein will be apparent to one of ordinary skill in the art, and will also be apparent in several ways to a wide range of attentive readers. Some embodiments address technical activities such as reading 810 digital system variables 218, writing 804 digital system variables 218, maintaining consistency in values 220 contained by variables 218, aligning 924 variables in memory 112, and ordering instructions 116 through the use of memory barriers 232 and 234, which are each an activity deeply rooted in computing technology. Some of the technical mechanisms discussed include, e.g., release barriers 232, acquire barriers 234, variable alignment 924, and a special value Z dedicated solely for use in indicating 230 that an update is still underway. Some of the technical effects discussed include, e.g., unitary conveyance 902 of update values 228, avoidance 904 of reliance on locks 908 for variable update conveyance, and improved performance 936 of multithreaded software by virtue of such lock-avoidance. Thus, purely mental processes are clearly excluded. Other advantages based on the technical characteristics of the teachings will also be apparent to one of skill from the description provided.

Some embodiments described herein may be viewed by some people in a broader context. For instance, concepts such as consistency, exclusivity, ordering, updating, and validity may be deemed relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems, such as how to efficiently update a set of variables so that when they are read only the non-updated values or only the update values are read—a mix of non-updated values and update values is never read. Other configured storage media, systems, and processes involving consistency, exclusivity, ordering, updating, or validity are outside the present scope. Accordingly, vagueness, mere abstractness, lack of technical character, and accompanying proof problems are also avoided under a proper understanding of the present disclosure.

Additional Combinations and Variations

Any of these combinations of code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants described above.

More generally, one of skill will recognize that not every part of this disclosure, or any particular details therein, are necessarily required to satisfy legal criteria such as enablement, written description, or best mode. Also, embodiments are not limited to the particular motivating examples, programming languages or libraries or runtimes, software processes, development tools, identifiers, data structures, data organizations, notations, control flows, pseudocode, naming conventions, or other implementation choices described herein. Any apparent conflict with any other patent disclosure, even from the owner of the present innovations, has no role in interpreting the claims presented in this patent disclosure.

Acronyms, Abbreviations, Names, and Symbols

Some acronyms, abbreviations, names, and symbols are defined below. Others are defined elsewhere herein, or do not require definition here in order to be understood by one of skill.

ALU: arithmetic and logic unit
API: application program interface
BIOS: basic input/output system
CD: compact disc
CPU: central processing unit
DVD: digital versatile disk or digital video disc
FPGA: field-programmable gate array
FPU: floating point processing unit
GPU: graphical processing unit
GUI: graphical user interface
IaaS or IAAS: infrastructure-as-a-service
IoT: Internet of Things
LAN: local area network
OS: operating system
PaaS or PAAS: platform-as-a-service
RAM: random access memory
ROM: read only memory
TPU: tensor processing unit
UEFI: Unified Extensible Firmware Interface
WAN: wide area network Some Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

The designations "Var1", "DestVar1A", "DestVar1B", and "Z" are used herein merely for convenience. Furthermore, there is no intent to limit the scope of the claims to variables or other computer-implemented data structures having the designations above. Rather, when a designation like one of the ones above is enclosed in parenthesis in the claims, the express intent is that the designation refers to the variable or other data structure preceding it similar to how the phrase "hereinafter referred to" may be used to precisely identify a party or concept in a contract. Indeed, a designation enclosed in parenthesis in the claims may be thought of as an alias for the variable or other data structure preceding it.

To further illustrate the availability of alternative designations, Var1 may also be referred to, e.g., as an "update status indication variable", DestVar1A may also be referred to, e.g., as a "first destination status variable", DestVar1B may also be referred to, e.g., as a "second destination status variable", and Z may also be referred to, e.g., as an "updating is underway value".

As used herein, a "computer system" (a.k.a. "computing system") may include, for example, one or more servers, motherboards, processing nodes, laptops, tablets, personal computers (portable or not), personal digital assistants, smartphones, smartwatches, smartbands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include code capable of or subject to scheduling, and possibly to synchronization. A thread may also be known outside this disclosure by another name, such as "task," "process," or "coroutine," for example. However, a distinction is made herein between threads and processes, in that a thread defines an execution path inside a process. Also, threads of a process share a given address space, whereas different processes have different respective address spaces. The threads of a process may run in parallel, in sequence, or in a combination of parallel execution and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

A "routine" is a callable piece of code which normally returns control to an instruction just after the point in a program execution at which the routine was called. Depending on the terminology used, a distinction is sometimes made elsewhere between a "function" and a "procedure": a function normally returns a value, while a procedure does not. As used herein, "routine" includes both functions and procedures. A routine may have code that returns a value (e.g., sin(x)) or it may simply return without also providing a value (e.g., void functions).

"Cloud" means pooled resources for computing, storage, and networking which are elastically available for measured on-demand service. A cloud may be private, public, community, or a hybrid, and cloud services may be offered in the form of infrastructure as a service (IaaS), platform as a service (PaaS), software as a service (SaaS), or another service. Unless stated otherwise, any discussion of reading from a file or writing to a file includes reading/writing a local file or reading/writing over a network, which may be a cloud network or other network, or doing both (local and networked read/write).

"IoT" or "Internet of Things" means any networked collection of addressable embedded computing nodes. Such nodes are examples of computer systems as defined herein, but they also have at least two of the following characteristics: (a) no local human-readable display; (b) no local keyboard; (c) the primary source of input is sensors that track sources of non-linguistic data; (d) no local rotational disk storage—RAM chips or ROM chips provide the only local memory; (e) no CD or DVD drive; (f) embedment in a household appliance or household fixture; (g) embedment in an implanted or wearable medical device; (h) embedment in a vehicle; (i) embedment in a process automation control system; or (j) a design focused on one of the following: environmental monitoring, civic infrastructure monitoring, industrial equipment monitoring, energy usage monitoring, human or animal health monitoring, physical security, or physical transportation system monitoring. IoT storage may be a target of unauthorized access, either via a cloud, via another network, or via direct local access attempts.

"Access" to a computational resource includes use of a permission or other capability to read, modify, write, execute, or otherwise utilize the resource. Attempted access may be explicitly distinguished from actual access, but "access" without the "attempted" qualifier includes both attempted access and access actually performed or provided.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses computational resource users, which may also include or be referred to as coroutines, threads, tasks, interrupt handlers, application processes, kernel processes, procedures, or object methods, for example. As a practical matter, a "process" is the computational entity identified by system utilities such as Windows® Task Manager, Linux® ps, or similar utilities in other operating system environments (marks of Microsoft Corporation, Linus Torvalds, respectively). "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). "Process" and "method" in the patent law sense are used interchangeably herein. Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided. Steps performed automatically are presumed to include at least one operation performed proactively.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment. Value conveyance operations such as replacing 804 values 220, reading 810 values 220, executing 806, 812 barriers, using 922 aligned variables, and many other operations discussed herein, are understood to be inherently digital. A human mind cannot interface directly with a CPU or other processor, or with RAM or other digital storage, to read and write the necessary data to perform the unitary update value conveyance steps taught herein. This would all be well understood by persons of skill in the art in view of the present disclosure.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

Throughout this document, use of the optional plural "(s)", "(es)", or "(ies)" means that one or more of the indicated features is present. For example, "processor(s)" means "one or more processors" or equivalently "at least one processor".

For the purposes of United States law and practice, use of the word "step" herein, in the claims or elsewhere, is not intended to invoke means-plus-function, step-plus-function, or 35 United State Code Section 112 Sixth Paragraph/ Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

One of skill will recognize that this innovation disclosure discusses various data values and data structures, and recognize that such items reside in a memory (RAM, disk, etc.), thereby configuring the memory. One of skill will also recognize that this innovation disclosure discusses various algorithmic steps which are to be embodied in executable code in a given implementation, and that such code also resides in memory, and that it effectively configures any general purpose processor which executes it, thereby transforming it from a general purpose processor to a special-purpose processor which is functionally special-purpose hardware.

Accordingly, one of skill would not make the mistake of treating as non-overlapping items (a) a memory recited in a claim, and (b) a data structure or data value or code recited in the claim. Data structures and data values and code are understood to reside in memory, even when a claim does not explicitly recite that residency for each and every data structure or data value or piece of code mentioned. Accordingly, explicit recitals of such residency are not required. However, they are also not prohibited, and one or two select recitals may be present for emphasis, without thereby excluding all the other data values and data structures and code from residency. Likewise, code functionality recited in a claim is understood to configure a processor, regardless of whether that configuring quality is explicitly recited in the claim.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as acquiring, aligning, collecting, conveying, executing, looping, nulling, performing, placing, reading, releasing, replacing, representing, retrieving, updating, using, zeroing (and acquires, acquired, aligns, aligned, etc.) with regard to a destination or other subject may involve intervening action such as the foregoing or forwarding, copying, uploading, downloading, encoding, decoding, compressing, decompressing, encrypting, decrypting, authenticating, invoking, and so on by some other party, including any action recited in this document, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 operating environment, also referred to as computing environment
102 computer system, also referred to as computational system or computing system
104 users, e.g., software developers
106 peripherals
108 network generally, including, e.g., LANs, WANs, software defined networks, clouds, and other wired or wireless networks
110 processor
112 computer-readable storage medium, e.g., RAM, hard disks
114 removable configured computer-readable storage medium
116 instructions executable with processor; may be on removable storage media or in other memory (volatile or non-volatile or both)
118 data
120 kernel(s), e.g., operating system(s), BIOS, UEFI, device drivers
122 tools, e.g., anti-virus software, firewalls, packet sniffer software, intrusion detection systems, intrusion prevention systems, other cybersecurity tools, debuggers, profilers, compilers, interpreters, decompilers, assemblers, disassemblers, source code editors, auto-completion software, simulators, fuzzers, repository access tools, version control tools, optimizers, collaboration tools, other software development tools and tool suites (including, e.g., integrated development environments), hardware development tools and tool suites, diagnostics, and so on
124 applications, e.g., word processors, web browsers, spreadsheets, games, email tools, commands
126 display screens, also referred to as "displays"
128 computing hardware not otherwise associated with a reference number 106, 108, 110, 112, 114
130 software generally, e.g., kernels, applications, tools, cloud services
200 system enhanced by update values conveyance functionality, including some or all of the functionalities 202

202 update values conveyance functionality in any form described herein
204 garbage collector, also referred to as "GC" or as "garbage collector code"
206 GC thread, namely, a thread which is at least primarily (over 50% of instructions) dedicated to garbage collector code
208 mutator thread, namely, a thread which is at least primarily (over 50% of instructions) dedicated to code other than garbage collector code; a mutator thread is often a user thread but may also be a kernel thread; "mutator" in the term indicates that the mutator thread may mutate (i.e., change) addresses which are used during garbage collection
210 garbage collector marking phase code
212 application thread
214 thread generally, e.g., kernel thread, device driver thread, application thread, system service thread, daemon, garbage collection thread, user interface thread, producer thread, consumer thread, or another thread of execution
216 unitary set of variables
218 variable generally
220 variable value generally
222 source variable, in terms of conveyance from source to destination
224 destination variable, in terms of conveyance
226 non-updated value, e.g., value in a source variable before the source variable is updated to hold an update value to be conveyed
228 update value to be conveyed
230 updating-is-underway value, also referred to as "Z"; may be any value in a given program that is not considered by that program to be a valid non-updated value or a valid update value, e.g., when a variable holds object addresses, NULL is a suitable value for Z because NULL is not a valid object address; reference numeral 230 is also used to designate an action, namely, to indicate updating is underway
232 release barrier
234 acquire barrier
236 full memory barrier
238 register in a processor
300 segment of memory, e.g., a region, page, block, or other area of memory which is managed at least in part by garbage collection
302 contiguous area of memory which has been allocated, and which is either in use or not known to be reclaimable (indicated in FIG. 3 by ✓) or else is known to be reclaimable because it is known to be no longer in use by the program that allocated it (indicated in FIG. 3 by X)
304 contiguous area of reclaimable memory resulting from compaction
306 compaction, e.g., relocation of one or more reclaimable areas to create a larger contiguous reclaimable area
308 marking; actions performed during garbage collection to mark memory areas as (i) in use or not known to be reclaimable, or (ii) known to be reclaimable
402 phases and sub-phases of garbage collection
404 sweep phase of garbage collection
406 stop-the-world sub-phase of garbage collection; also referred to as "STW"
602 individually addressable unit of memory, e.g., byte
604 4-byte boundaries
700 digital item, e.g., record, object, data structure, variable, or other artifact represented in a memory 112

702 characteristic of a digital item, e.g., location, size, age, credibility, ownership, access count, and so on
704 object, in an object-oriented programming sense
800 flowchart; 800 also refers to unitary values conveyance methods illustrated by or consistent with the FIG. 8 flowchart
802 place unitary values
804 replace a value with a value; the replacement may be a different value or a copy of the same value, unless indicated otherwise (mention of Z or value 230 or inequality each indicate the replacement is different); replacement 804 involves writing the replacement value over the replaced value
806 execute a release barrier; this execution does not necessarily involve executing any additional processor instruction per se beyond the other instructions described, but does impose an order on at least some of those other instructions, as discussed herein
808 retrieve unitary values
810 read a value
812 execute an acquire barrier; this execution does not necessarily involve executing any additional processor instruction per se beyond the other instructions described, but does impose an order on at least some of those other instructions, as discussed herein
814 repeat one or more instructions as indicated, e.g., by a flowchart or pseudocode loop provided herein
900 flowchart; 900 also refers to unitary values conveyance methods illustrated by or consistent with the FIG. 9 flowchart (which incorporates the steps of FIG. 8)
902 convey update values from source variables to destination variables
904 avoid reliance on use of a lock to perform unitary value conveyance
906 rely on use of a lock to perform unitary value conveyance
908 a lock; may be implemented using a mutex, semaphore, or critical section, for example
910 differ from valid non-updated values
912 differ from valid update values; in many cases the group of valid non-updated values and the group of valid update values will be the same group, but in other cases they may differ, e.g., a update may restrict addresses to a specified range or restrict quantities to a multiple of N, N>1
914 represent a characteristic 702 in a digital form; representation may be direct or may involve indirection, e.g., a variable may represent an address by specifying an entry in a table of addresses, or as a pointer to a pointer, or as a pointer to a pointer to a pointer, or as a pointer to a structure containing the represented characteristic, etc.
916 memory address, e.g., location of a variable in RAM
918 size, e.g., number of bytes in a memory free area or an object
922 use an aligned variable
924 align a variable, e.g., on an N-byte boundary, where N>1 and N is a multiple of two
926 zero a variable, e.g., overwrite it with all zero bits; may also be called "nulling" the variable
928 pointer variable, namely, a variable designed to hold memory addresses
930 use an atomic action
932 an atomic action
934 an action generally; in patent terms an action may be considered a step in its own right or be considered a part of a larger step 936 perform or execute software 938 garbage collection as an act that may be performed; activity performed by executing garbage collection software 940 application execution; activity performed by executing application software 942 any step discussed in the present disclosure that has not been assigned some other reference numeral

CONCLUSION

In short, the teachings herein provide a variety of computing system 102 variable unitary update functionalities 202 which enhance the performance of multithreaded software. Garbage collection 938 is one example of such highly performant lock-free multithreaded software 130. Unitary lock-free updates to a set 216 of variables 218 involves an updating value Z 230, release barriers 232 and acquire barriers 234 that enforce orderings on code 130 execution 936, and atomicity 932 resulting from variable alignment 924. Conveyance 902 is accomplished with a values placing step 802 and a values retrieving step 808. Values placing 802 replaces 804 a non-updated value 226 in a variable Var1 222 with Z 230, executes 806 a release barrier 232, replaces 804 the non-updated values 226 of other variables 222 with update values 228, executes 806 another release barrier 232, and replaces 804 Z 230 with the Var1 222 update value 228. Values retrieving 808 reads 810 from Var1 222 into DestVar1A 224, executes 812 an acquire barrier 234, reads 810 from the other variables 222 into respective destination variables 224, executes 812 another acquire barrier 234, reads 810 from Var1 222 into DestVar1B 224, and repeats 814 if DestVar1A is Z or if DestVar1A and DestVar1B are unequal. These solutions 200, 900 each conveys 902 the update values 228 into source variables 222 and from there into destination variables 224 without locks 908, as a unit 216.

Embodiments are understood to also themselves include or benefit from tested and appropriate security controls and privacy controls such as the General Data Protection Regulation (GDPR), e.g., it is understood that appropriate measures should be taken to help prevent misuse of computing systems through the injection or activation of malware into software. Use of the tools and techniques taught herein is compatible with use of such controls.

Although Microsoft technology is used in some motivating examples, the teachings herein are not limited to use in technology supplied or administered by Microsoft. Under a suitable license, for example, the present teachings could be embodied in software or services provided by other cloud service providers or other development environment providers or other runtime providers.

Although particular embodiments are expressly illustrated and described herein as processes, as configured storage media, or as systems, it will be appreciated that discussion of one type of embodiment also generally extends to other embodiment types. For instance, the descriptions of processes in connection with FIGS. 8 and 9 also help describe configured storage media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Those of skill will understand that implementation details may pertain to specific code, such as specific thresholds, comparisons, sample fields, specific kinds of runtimes or programming languages or architectures, specific scripts or other tasks, and specific computing environments, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

With due attention to the items provided herein, including technical processes, technical effects, technical mechanisms, and technical details which are illustrative but not comprehensive of all claimed or claimable embodiments, one of skill will understand that the present disclosure and the embodiments described herein are not directed to subject matter outside the technical arts, or to any idea of itself such as a principal or original cause or motive, or to a mere result per se, or to a mental process or mental steps, or to a business method or prevalent economic practice, or to a mere method of organizing human activities, or to a law of nature per se, or to a naturally occurring thing or process, or to a living thing or part of a living thing, or to a mathematical formula per se, or to isolated software per se, or to a merely conventional computer, or to anything wholly imperceptible or any abstract idea per se, or to insignificant post-solution activities, or to any method implemented entirely on an unspecified apparatus, or to any method that fails to produce results that are useful and concrete, or to any preemption of all fields of usage, or to any other subject matter which is ineligible for patent protection under the laws of the jurisdiction in which such protection is sought or is being licensed or enforced.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a", "an", and "the" are inclusive of one or more of the indicated item or step. In particular, in the claims a reference to an item generally means at least one such item is present and a reference to a step means at least one instance of the step is performed. Similarly, "is" and other singular verb forms should be understood to encompass the possibility of "are" and other plural forms, when context permits, to avoid grammatical errors or misunderstandings.

Headings are for convenience only; information on a given topic may be found outside the section whose heading indicates that topic.

All claims and the abstract, as filed, are part of the specification.

To the extent any term used herein implicates or otherwise refers to an industry standard, and to the extent that applicable law requires identification of a particular version of such as standard, this disclosure shall be understood to refer to the most recent version of that standard which has been published in at least draft form (final form takes precedence if more recent) as of the earliest priority date of the present disclosure under applicable patent law.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A multithreaded system configured for lock-free conveyance of variable value updates as a unitary set, the system comprising:
a memory containing a set of variables having respective non-updated values, the set including an update status indication variable (Var1) and at least one other variable;
a processor in operable communication with the memory, the processor configured to perform steps for conveying variable value updates as a unitary set without lock reliance, the steps including a values placing step and a values retrieving step;
wherein the values placing step comprises performing the following actions in sequence: replacing a non-updated value in the update status indication variable (Var1) with a different value (Z) that indicates updating is underway, said different value (Z) being different from all valid non-updated values of the set of variables and also being different from all valid update values of the set of variables, executing a first release barrier, replacing the non-updated value of each other variable with a respective corresponding update value, executing a second release barrier, and replacing the value (Z) in the update status indication variable (Var1) with a different value that is also an update value;
wherein the values retrieving step comprises performing the following actions in sequence: reading from the update status indication variable (Var1) into a first destination status variable (DestVar1A), executing a first acquire barrier, reading from other variables of the set into respective destination variables, executing a second acquire barrier, reading from the update status indication variable (Var1) into a second destination status variable (DestVar1B), and repeating the foregoing retrieving step actions if the first destination status variable (DestVar1A) has the value (Z) or if the first destination status variable (DestVar1A) and the second destination status variable (DestVar1B) contain different values from each other;
whereby the system conveys the update values through the variables to respective destination variables without lock reliance, and the system conveys the update values as a unitary set in that after the values placing step and the values retrieving step are completed the values in the destination variables will not include both a non-updated value and an update value.

2. The system of claim 1, wherein one of the non-updated values represents an address of a free space area and the corresponding update value represents an address of an allocated item, and wherein another of the non-updated values represents a size of the free space area and the corresponding update value represents a size of the allocated item.

3. The system of claim 1, wherein the destination variables include at least one of the following: a location in a random access memory, or a register in a processor.

4. The system of claim 1, wherein at least one of the following holds: at least one of the release barriers is implemented as part of a full memory barrier, or at least one of the acquire barriers is implemented as part of a full memory barrier.

5. The system of claim 1, wherein the values placing step and the values retrieving step are each performed without relying on any full memory barrier, a full memory barrier being a memory barrier which operates both as a release barrier and as an acquire barrier.

6. The system of claim 1, wherein the variables are each naturally aligned.

7. A method supporting lock-free conveyance of variable value updates as a unitary set in a multithreaded computing system, the method comprising a values placing step which performs the following actions in sequence:
- replacing a non-updated value in an update status indication variable (Var1) of a set of variables with a different value (Z) that indicates updating is underway, said different value (Z) being different from all valid non-updated values of the set of variables and also being different from all valid update values of the set of variables;
- executing a first release barrier;
- replacing non-updated values of other variables of the set with respective update values;
- executing a second release barrier; and
- replacing the value (Z) in the update status indication variable (Var1) with a different value that is also an update value;
- whereby the method places the update values in the variables without lock reliance, and the method places the update values as a unitary set in that after the values placing step actions are completed the values in the variables will not include both a non-updated value and an update value.

8. The method of claim 7, further comprising a values retrieving step which performs the following actions in sequence:
- reading from the update status indication variable (Var1) into a first destination status variable (DestVar1A);
- executing a first acquire barrier;
- reading from other variables of the set into respective destination variables;
- executing a second acquire barrier;
- reading from the update status indication variable (Var1) into a second destination status variable (DestVar1B); and
- repeating the foregoing retrieving step actions if the first destination status variable (DestVar1A) has the value (Z) or if the first destination status variable (DestVar1A) and the second destination status variable (DestVar1B) contain different values from each other;
- whereby the method retrieves the update values from the variables into respective destination variables without lock reliance, and the method conveys the update values as a unitary set in that after the values placing step and the values retrieving step are completed the values in the destination variables will not include both a non-updated value and an update value.

9. The method of claim 8, wherein the values placing step is performed by a thread (P) and the values retrieving step is performed by a different thread (R).

10. The method of claim 8, wherein one of the non-updated values represents an address of a free space area and the corresponding update value represents an address of an allocated item, and wherein another of the non-updated values represents a size of the free space area and the corresponding update value represents a size of the allocated item.

11. The method of claim 7, wherein replacing the non-updated value in the update status indication variable (Var1) with the value (Z) comprises zeroing the update status indication variable (Var1).

12. The method of claim 7, wherein the set of variables consists of two variables, wherein the method executes in a device containing a digital item, and wherein each of the variables in the set represents a respective characteristic of the digital item.

13. The method of claim 7, wherein the values placing step is performed without implementing any of the release barriers as part of a full memory barrier.

14. The method of claim 7, wherein each replacing action is individually atomic.

15. The method of claim 7, wherein the method is performed by garbage collection software or by multithreaded application software, or both.

16. A computer-readable storage medium configured with data and instructions which upon execution by a processor cause a multithreaded computing system to perform a method supporting lock-free conveyance of variable value updates as a unitary set, the method comprising a values retrieving step which performs the following actions in sequence:
- reading from an update status indication variable (Var1) of a set of variables into a first destination status variable (DestVar1A);
- executing a first acquire barrier;
- reading from other variables of the set into respective destination variables;
- executing a second acquire barrier;
- reading from the update status indication variable (Var1) into a second destination status variable (DestVar1B); and
- repeating the foregoing retrieving step actions if the first destination status variable (DestVar1A) has a value (Z) that indicates updating is underway, or if the first destination status variable (DestVar1A) and the second destination status variable (DestVar1B) contain different values from each other, said value (Z) being different from all valid non-updated values of the set of variables and also being different from all valid update values of the set of variables;
- whereby the method retrieves update values from the variables into respective destination variables without lock reliance, and the method retrieves the update values as a unitary set in that after the values retrieving step actions are completed the values in the destination variables will not include both a non-updated value and an update value.

17. The computer-readable storage medium of claim 16, wherein the method further comprises a values placing step which performs the following actions in sequence:
- replacing a non-updated value in the update status indication variable (Var1) with the value (Z) that indicates updating is underway;
- executing a first release barrier;
- replacing non-updated values of other variables of the set with respective update values;
- executing a second release barrier; and
- replacing the value (Z) in the update status indication variable (Var1) with a different value that is also an update value;
- whereby the method places update values in the variables without lock reliance, and the method places the update values as a unitary set in that after the values placing step actions are completed the values in the variables will not include both a non-updated value and an update value.

18. The computer-readable storage medium of claim 16, wherein the value (Z) which indicates updating is underway also represents one of the following: zero, not-a-number, or negative one.

19. The computer-readable storage medium of claim 16, wherein the method is performed by garbage collection software.

20. The computer-readable storage medium of claim 16, wherein the method is performed by multithreaded application software.

\* \* \* \* \*